(12) United States Patent
Rosenwach et al.

(10) Patent No.: US 9,896,236 B2
(45) Date of Patent: Feb. 20, 2018

(54) FRAME FOR DIVIDED WATER TANK

(71) Applicant: ROSENWACH TANK CO., LLC, Long Island City, NY (US)

(72) Inventors: Andrew Rosenwach, Long Island City, NY (US); Robert Redlien, Garden City, NY (US)

(73) Assignee: ROSENWACH TANK CO., LLC, Long Island City, NY (US)

( * ) Notice: Subject to any disclaimer, the term of this patent is extended or adjusted under 35 U.S.C. 154(b) by 192 days.

(21) Appl. No.: 15/015,177

(22) Filed: Feb. 4, 2016

(65) Prior Publication Data

US 2016/0152376 A1    Jun. 2, 2016

Related U.S. Application Data

(63) Continuation of application No. 14/673,156, filed on Mar. 30, 2015, now Pat. No. 9,272,809, which is a continuation of application No. 13/623,670, filed on Sep. 20, 2012, now Pat. No. 9,027,773.

(60) Provisional application No. 61/660,461, filed on Jun. 15, 2012.

(51) Int. Cl.
   *E03B 11/02*   (2006.01)
   *B65D 8/00*    (2006.01)
   *E03B 11/00*   (2006.01)

(52) U.S. Cl.
   CPC ............... *B65D 9/04* (2013.01); *E03B 11/02* (2013.01); *E03B 2011/005* (2013.01)

(58) Field of Classification Search
   CPC ............ E03B 11/02; E03B 11/12; B65D 9/04

USPC ..... 220/4.12, 4.09, 4.08, 4.04, 4.16; 217/75, 217/4, 72

See application file for complete search history.

(56) References Cited

U.S. PATENT DOCUMENTS

| | | | |
|---|---|---|---|
| 244,883 A | 7/1881 | Gantt | 73/426 |
| 255,433 A | 3/1882 | Knight | 217/75 |
| 460,998 A * | 10/1891 | Speer | B65D 90/026 217/4 |
| 614,549 A * | 11/1898 | Hoff | B65D 90/10 217/4 |
| 764,545 A | 7/1904 | Arkell | 217/3 CB |
| 1,956,928 A | 5/1934 | Quimby | 217/72 |
| 3,477,604 A | 11/1969 | Kridle | 217/12 R |
| 3,667,639 A | 6/1972 | Pfeil | 217/4 |
| 7,654,401 B2 | 2/2010 | Obergoenner | 217/65 |
| 9,027,773 B2 | 5/2015 | Rosenwach | 217/72 |

* cited by examiner

*Primary Examiner* — King M Chu
(74) *Attorney, Agent, or Firm* — Ostrolenk Faber LLP

(57) ABSTRACT

A tank has a circumferential wall defined by a plurality of separate elements in the form of vertical staves. Adjacent elements are shaped so that they are squeezed together to prevent leakage past adjacent elements. Hoops surround the wall elements. One hoop is a plurality of segments. Truss rods connect separate elements of the hoop to a support inside the tank. The truss rods of the hoop connect the hoop segments to the inside support in the tank and are tightened thereto for drawing the hoop wall elements inward to the truss rod supports, squeezing the adjacent wall elements together for preventing leakage between adjacent elements. A divider across the tank has the supports thereon for receiving the ends of the truss rods in the tank. Other staves define a divider of staves. Vertical beams support them.

13 Claims, 8 Drawing Sheets

FRAME FOR DIVIDED WATER TANK

CROSS-REFERENCE TO RELATED APPLICATION

This is a continuation of U.S. patent application Ser. No. 14/673,156, filed Mar. 30, 2015, which is a continuation of U.S. patent application Ser. No. 13/623,670, filed Sep. 20, 2012, now U.S. Pat. No. 9,027,773, issued May 12, 2015, which is based on and claims priority to U.S. Provisional Application Serial No. 61/660,461, filed on Jun. 15, 2012 and entitled FRAME FOR DIVIDED WATER TANK, the disclosures of which are incorporated by reference herein.

BACKGROUND OF THE INVENTION

On a large number of commercial and industrial buildings, a large water tank is placed on the roof to supply water for standard uses and emergency uses, particularly if the regular water supply to the building is interrupted. The water tanks are typically either made of metal or of wood. The invention hereof is primarily concerned with a wooden water tank, wherein the body of the tank is entirely of wood, although it may be applicable to a wood tank that is all or in part clad with a metal covering.

A typical water tank has an undivided water compartment that is not internally divided into two or more compartments. If the interior of the tank is divided into two or more compartments or chambers, they are preferably sealed from each other so as to provide that number of separate, and independently controllable water supplies from a single tank. Of those water tanks with separate compartments, it is only known to use tanks made of metal and to separate the compartments by placing dividing walls within the metal tank. When the tank is of metal, the compartments dividing wall is also of metal and the tank is assembled by attaching, e.g. by welding or other leak resistant connection, the dividing wall to the interior of the tank.

Applicant is unaware and prior art is not known which discloses a water tank, particularly of the type used on the roof of a building, which is a wooden tank that is internally divided into compartments and particularly a wooden tank that is divided by a wooden dividing wall.

Wooden tanks have certain benefits, including preference by a customer, satisfying local building codes, local availability of materials, sealable against leakage during construction and extended seal due to the effect of water on wood, minimal prolonged exposure of the water to metal due to wood surfaces and to attachment materials in the water, which may corrode unless made of more expensive corrosion resistant metal and other reasons known to persons of skill in the art.

SUMMARY OF THE INVENTION

A separated compartment divided wooden tank according to this disclosure is a preferably circular shape shell defining the wooden tank, since that is the shape that can best withstand the forces of clamping together the wood staves of which the tank shell and the dividing wall are preferably constructed. The staves forming the tank are preferably narrow width boards that extend over the full height of the tank. Neighboring staves have abutting edges in sealing contact over the entire height of the tank.

The compartment dividing wall (or walls) in the tank is also preferably comprised of a plurality of narrow width (i.e., short height when the wall is assembled) boards or wood staves. Those boards or staves may be arrayed horizontally, one atop the other, and the abutting edges of neighboring staves or boards are in sealing contact across the entire width of the dividing wall. The dividing wall is securely attached to the interior of the wood tank wall.

All of the adjacent neighboring staves of the tank and adjacent neighboring boards or staves of the dividing wall and the connections between the dividing wall(s) in the tank and the wall (shell) of the tank and the floor of the tank are all securely attached, as described below, to seal the tank, the dividing wall(s) and the connections between the dividing wall(s) and the tank and the tank bottom wall, thereby forming two or more essentially leak proof compartments in the same tank. The compartments so formed are independent of each other so that one may be used, filled, emptied, etc. without affecting the other(s). Although two compartments are described above and in the following more detailed description, the tank may be divided by dividing walls into more than two separate compartments, using dividing walls formed of wood in the manner described above. The attachments between tank parts preferably avoid the use of possibly toxic adhesives and connecting elements between tank parts and eliminates or minimizes the use of possible corrodible metal within the tank, including rods, beams and fastenings exposed to water in the tank.

Several types of element fastenings and stave clamping devices are used for the tank. They may include some or all of the following. Several hoops wrap around the outside of the tank at spaced apart height intervals along the tank. The hoops may be drawn tight, squeezing the abutting edges of neighboring vertical staves together as the hoops bias the staves together to seal neighboring staves against each other to prevent leakage through the tank wall.

Sets of axially oriented and axially extended beams are arrayed at spaced intervals over the cross direction, e.g., radial width along the dividing wall. Those beams are clamped against opposite sides of the wall, usually in opposing pairs. They clamp the individual horizontal boards of the dividing wall in vertical alignment.

Elongate first truss rods extend between nearly oppositely located staves around the tank. The first truss rods are tightened to the respective staves to urge nearly opposite staves of the tank wall toward each other, particularly in the vicinity of a connection between the dividing wall and the tank wall. The first truss rods or other types of connections draw the tank wall against the lateral end edges of the dividing wall and against the periphery of the tank bottom. The first truss rods also may pass through the axially extended beams. Connections for the beams located at the top and the bottom of the dividing wall squeeze the boards of the dividing wall together from top to bottom for that wall, sealing that wall against leakage.

There may be second, generally radial truss rods extending from a fixture on the dividing wall out to the wall of the tank at intervals around the circumference of the tank. These rods are also attached at the tank wall and tightened to bias the staves of the wall radially inward.

All of the rod connections to and through the walls and the beams are tightened where appropriate and possible, using preferably non-corroding metal connections. Essentially all of the numerous adjacent parts are drawn together by tightened rods for clamping parts to prevent leakage between adjacent connected parts.

DESCRIPTION OF PREFERRED EMBODIMENTS

Alternative embodiments of wooden tanks with a dividing wall may be envisioned by one skilled in the art.

Figure 1:
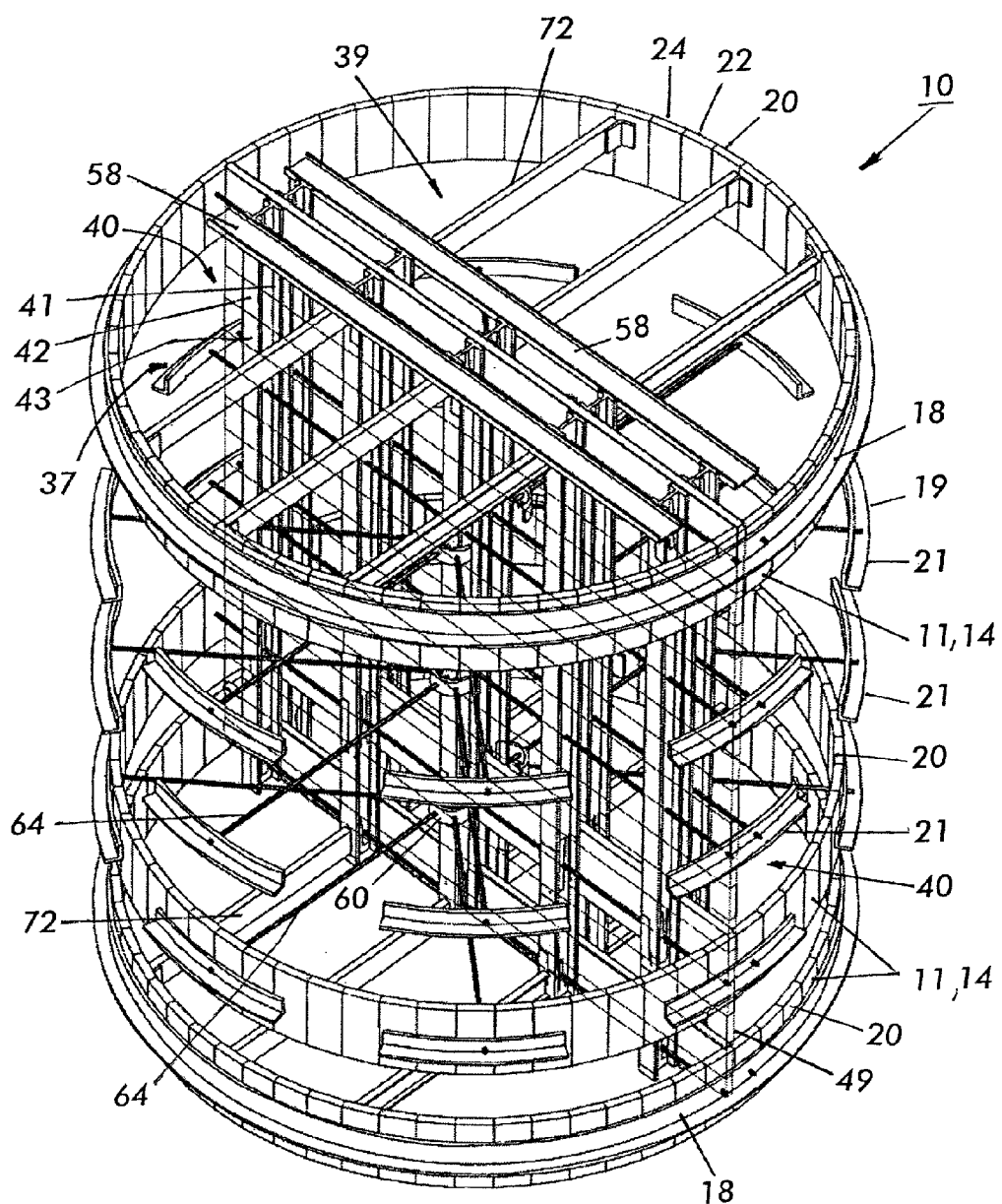
FIG. 1 is a schematic perspective view of a first embodiment of a compartmented wooden water tank. Some elements are partially removed to permit viewing.
Figure 8:
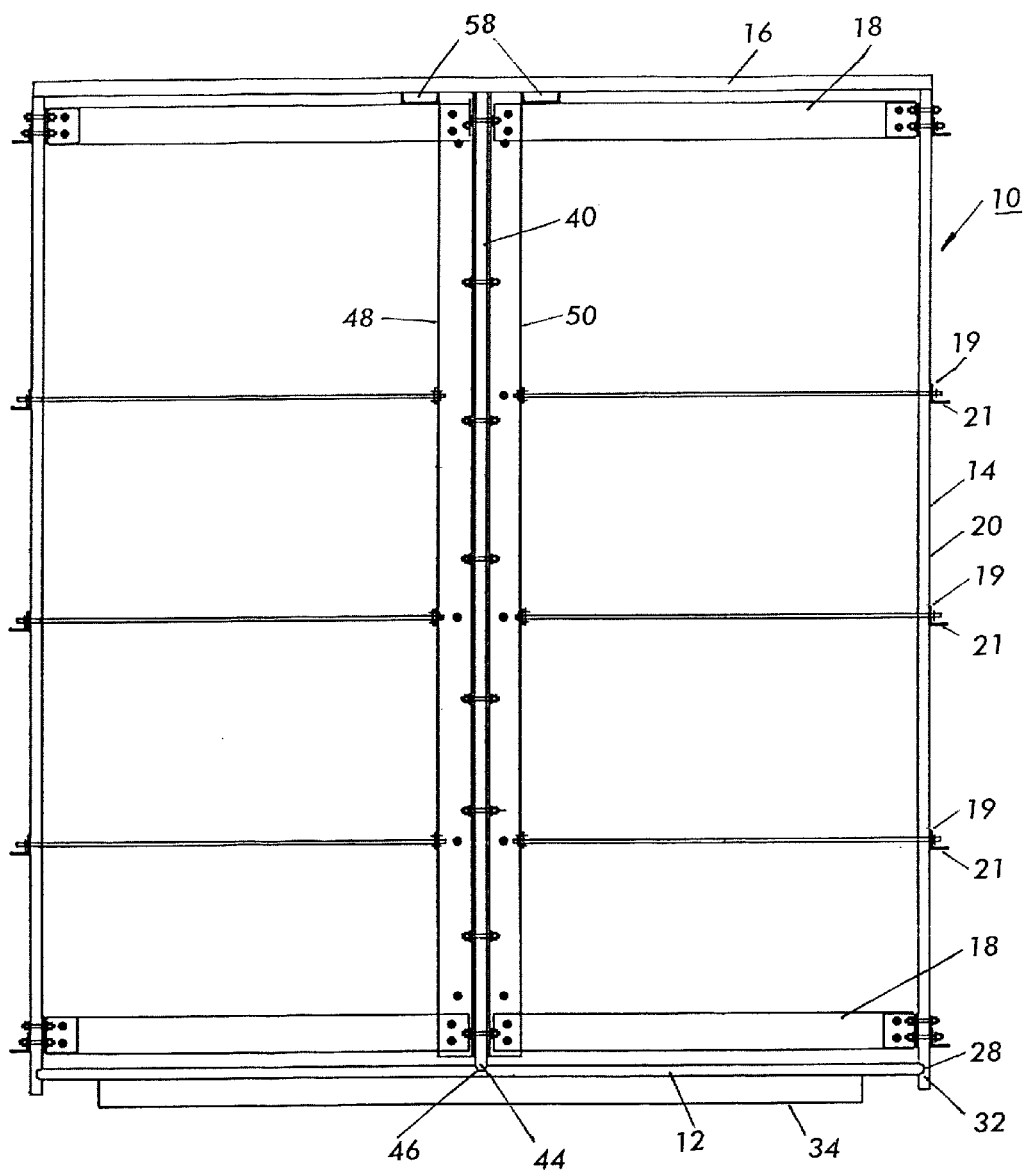
FIG. 8 is an elevational, cross-sectional view of the tank in FIG. 1.

In a first embodiment of FIGS. 1, 8, a tank 10 includes a cylindrical shell 11 comprised of wood staves and includes a flat wood tank bottom or floor 12 to which a sidewall 11, 14 of the tank is attached. There is wood dunnage 34 below the floor 12 which supports and stiffens the floor against the weight of water above the floor. The open top of the tank is closed by a tank top 16 also preferably of wood. The top 16 of the tank is also leakage resistant, but the water level does not pass over the top of the tank and there is little danger of leakage in or out. There is no pressure head from water above the top of the tank, although that pressure head is present based on water above the tank bottom. In accordance with the preferred embodiments of the invention, the bottom 12 of the tank and the sidewall 14 of the tank are wood constructions, without metal as one of the elements of those tanks, except for fastening and clamping devices, described below.

The tank 10 is typically about 12 to 18 feet in height and about 12 to 18 feet in diameter as the designer of a specific tank designates. These dimensions are a matter of choice and are dependent in part upon the size and configuration of the building for which the tank is provided the desired size and water storage capacity, and the duration of a water storage in the tank.

The horizontal cross-section of the tank shell 11 is circular, as that is a preferred shape for supporting the tank against radial direction collapse when pressure is applied to the tank by hoops 18 that stiffen and tension the tank wall 14 to maintain the shape of the tank without collapse.

The tank shell wall is comprised of many individual narrow width wooden staves or boards 20, 22, 24, et al. of the height or the length of the tank. Lateral edges of adjacent staves are held next to one another to define the circular cylinder sidewall 14 of the tank.

A plurality of hoops 18, 19 each extending completely around the outside of the tank wall 14, are arrayed at selected axially spaced height intervals of, for example, about one foot apart. That spacing is a matter of choice. In this embodiment, the top and bottom hoops 18 of the tank are unbroken around the entire circumference. The three intermediate hoops 19 are comprised of circumferentially separated arcuate segments 21, each of L-shaped cross section. Each segment is wrapped over a respective group of adjacent staves. The segments are drawn radially inward by later described second radial truss rods. The hoops are typically of metal. The hoops are strong enough to retain the below described dividing wall 40 between tank compartments sealed to the shell of the tank, when the compartments are filled or empty. The unbroken hoops 18 are tightened around the wall 14 by standard tightening devices 23 for a hoop, which may include opposing separated tabs joined by a connection element.

The wall 14 and its staves 20, 22, 24, et al. are arranged around the floor 12 of the tank, which thereby defines the diameter and circumference of the tank wall. A leakage preventing groove 28 passing around the bottom of the tank wall through each of the staves 20, 22, 24 is of a vertical cross-section like the peripheral edge 32 of the tank floor 12, and that edge projects into and is received by the groove 28 at the bottom of the wall. The edge 32 fitted into the groove 28 provides a liquid leakage preventing fit. Additional leakage resistant elements, such a plastic gasket placed in the base of the groove 28 may help prevent leakage.

A wooden dividing wall 40 in the tank extends the height of the tank and across the full width of the tank preferably along a diameter of the cylindrical tank. This defines two water containment compartments 37, 39 at opposite sides of the wall 40. But, the wall could be at a chord off a diameter, resulting in two compartments that are separated by the wall being of different volumes.

The dividing wall 40 is preferably comprised of a stack of boards or staves 41, 42, et al. for example, of the type of which the wall 14 of the tank is fabricated, although the latter is not required. The dividing wall 40 may be comprised of boards or staves of different width (vertical height) and thickness than the staves 20, 22, 24 forming tank wall 14. It has thus far been found preferable to have at least most or all of the individual boards 41, 42 of the dividing wall be short in axial direction height and extend over the entire diameter or chord of the tank, defining a vertical stack of the short height, long width boards. However, the dividing wall might instead be arranged with a plurality of adjacent staves extending in a vertical direction, like the outer shell wall 14.

The dividing wall 40 should be securely attached to the sidewall 14 of the tank and to the floor 12 of the tank so that the dividing wall does not permit leakage across that wall between the compartments 37 and 39, no matter how each of the compartments might be differently filled.

The bottom edge 44 of the dividing wall 40 is received in a correspondingly shaped groove 46 in the floor 12 of the tank. The edge 44 and the groove 46 are respectively so sized and shaped as to seal against leakage of water past the bottom edge of the wall. An additional leakage prevention device may be supplied at the groove, such as a strip of flexible plastic, or gasket or washer material, or the like. That same type of connection is not required for the top of the tank, because there is no pressure head of water above the tank that is urged to pass around the wall.

Each lateral edge 49 of the dividing wall 40 is received in a correspondingly shaped groove 51 in diametrically opposite staves 53 and 54 of the tank wall 14. The edge 49 of the dividing wall and the groove 51 in the tank wall are shaped and sized to prevent leakage of water past the dividing wall. An additional element to prevent leakage, such as a strip of a plastic material et al., may be placed along the groove to prevent leakage.

Especially when the dividing wall 40 is comprised of a plurality of boards 41, 42 extending horizontally, there is a possibility that water pressure on the wall, warping of the wood or some shifting of the boards might occur, so that the boards of the dividing wall might become misaligned above one another and present leakage paths for water past the wall. This is not likely to happen to the staves or boards of the outer wall 14 of the tank because the hoops 18, 19 hold those staves tightly and the staves held tightly by the hoops are not likely to deform or shift.

At spaced apart positions across the (diametric) width of the dividing wall 40, there are pairs of opposing I-shaped support beams 48 at one side of the wall and 50 at the opposite side of the wall. Each of the I-beams extends the full height of the dividing wall 40. Each pair of beams is connected by a plurality of fasteners 52 between the I-beams. When the fasteners 52 are tightened, the beams are pressed against the opposite sides of the wall 40 and that fixes the boards 41, 42, et al. of the dividing wall in alignment over the height of the wall and keeps the adjacent horizontal boards abutting to seal the dividing wall.

First truss rods 54, 56 are spaced from, but near to, respective opposite sides of the dividing wall 40. With the dividing wall on a diameter of the tank, each of the first truss rods 54, 56 extends on a chord across the width of the tank. The first truss rods pass through holes 57 formed in the I-beams 48, 50. The first truss rods pass through the side walls of the tank. The above described hoop segments 19 have holes that receive the ends 59 of the first truss rods 54, 56, so that the first truss rods are tightened into the hoop segments 19 on the outside of the shell of the tank. This pulls radially inward the staves of the tank wall including the staves that receive the first truss rods 54 and 56. This tightens the hoop segments 19 against the staves. There is a respective channel cover 58 at the top of the tank just outward of the truss rods 54 and 56.

Figure 4:
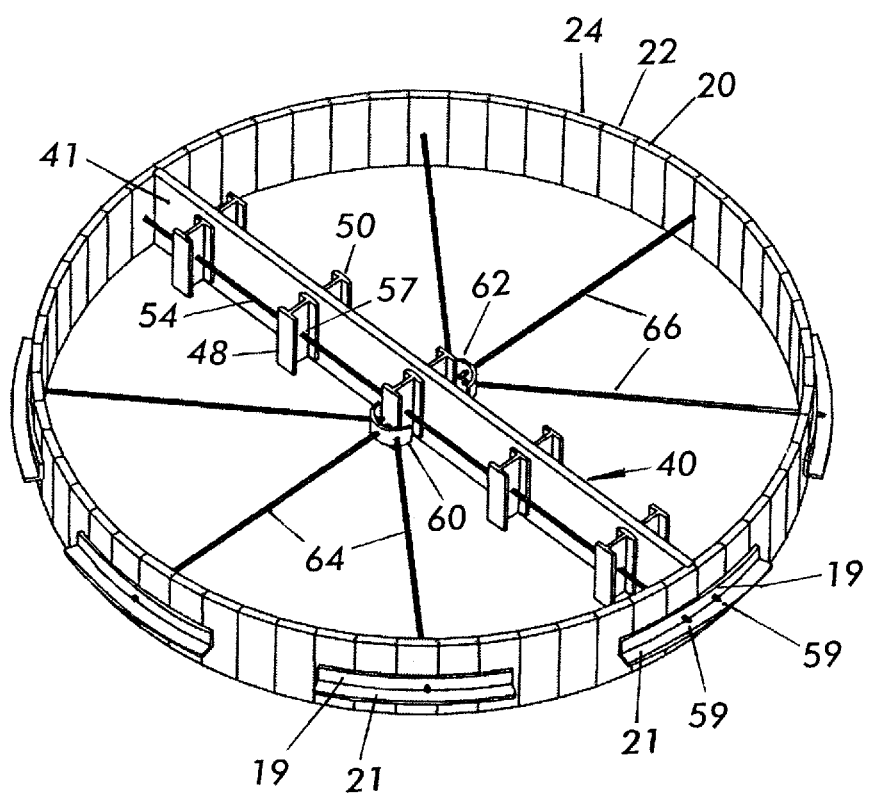
FIG. 4 is a perspective view of a middle section of the tank in FIG. 1.
Figure 5:
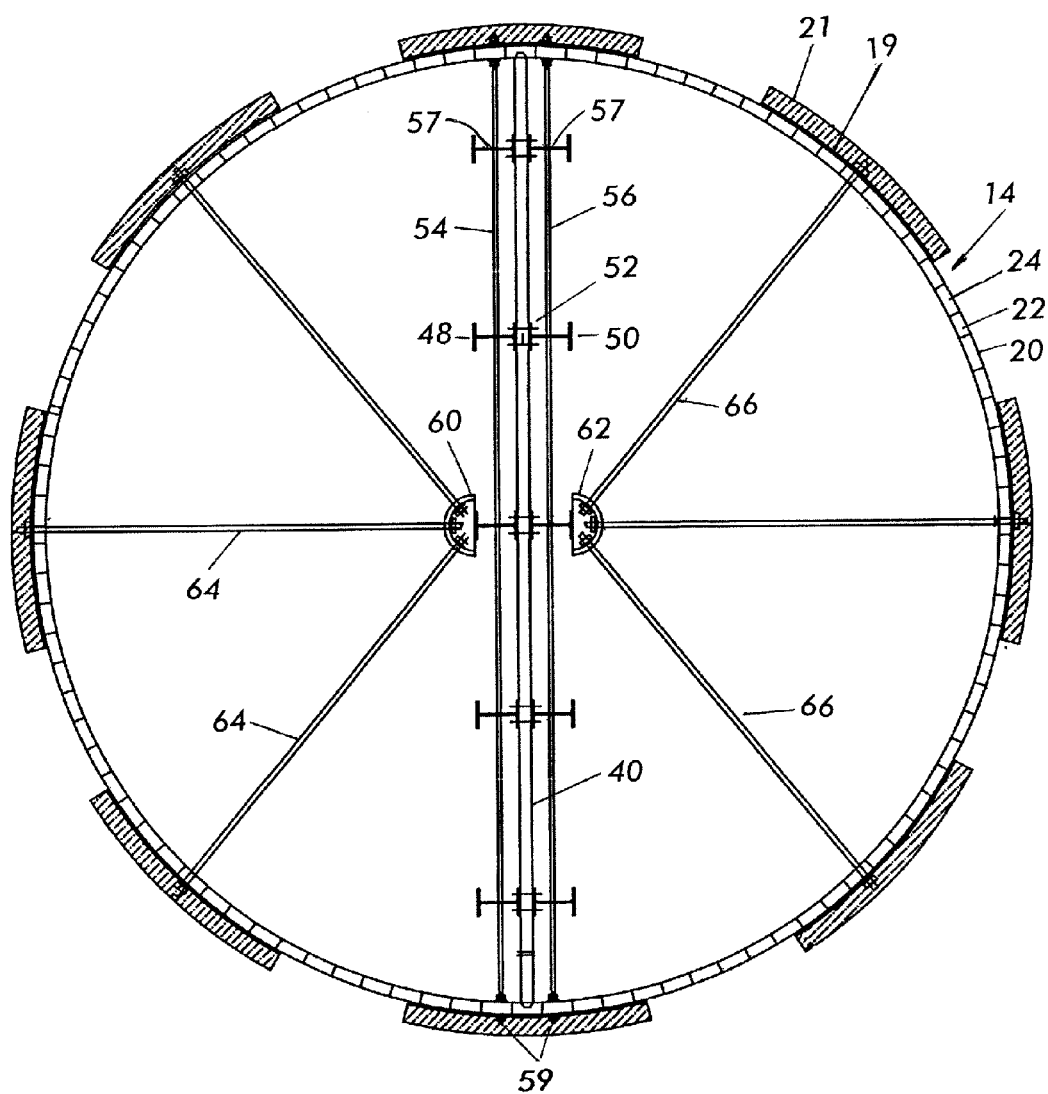
FIG. 5 is a view from above at a cross section at the middle section of the tank in FIG. 1.
Figure 6:
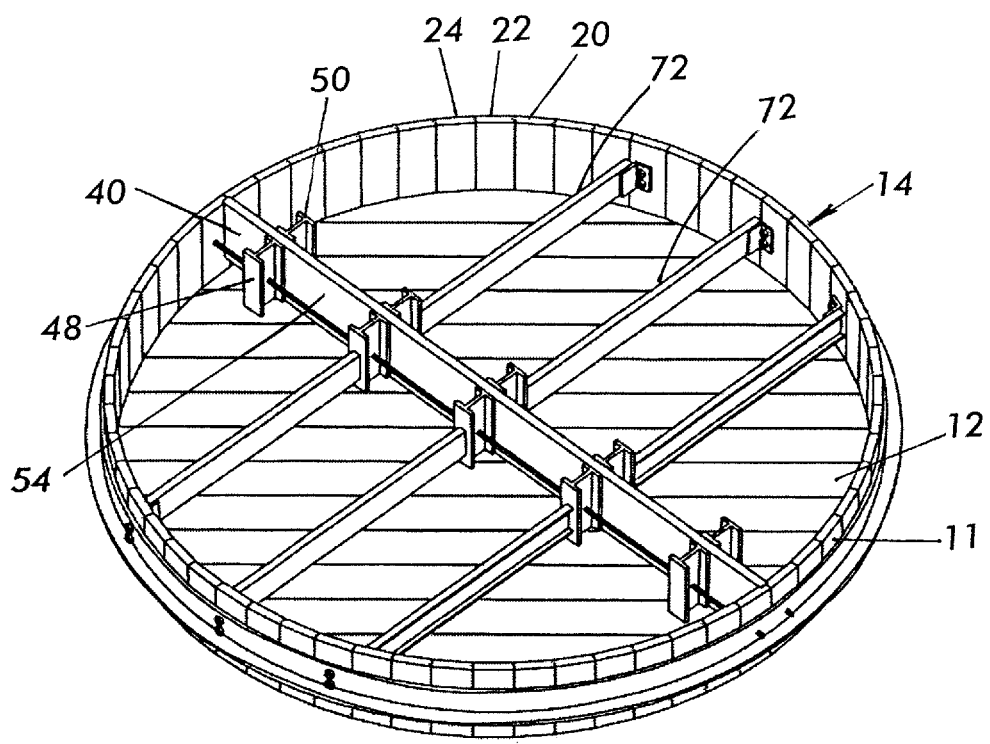
FIG. 6 is a perspective view from above at a cross section at the bottom section of the tank in FIG. 1.
Figure 7:
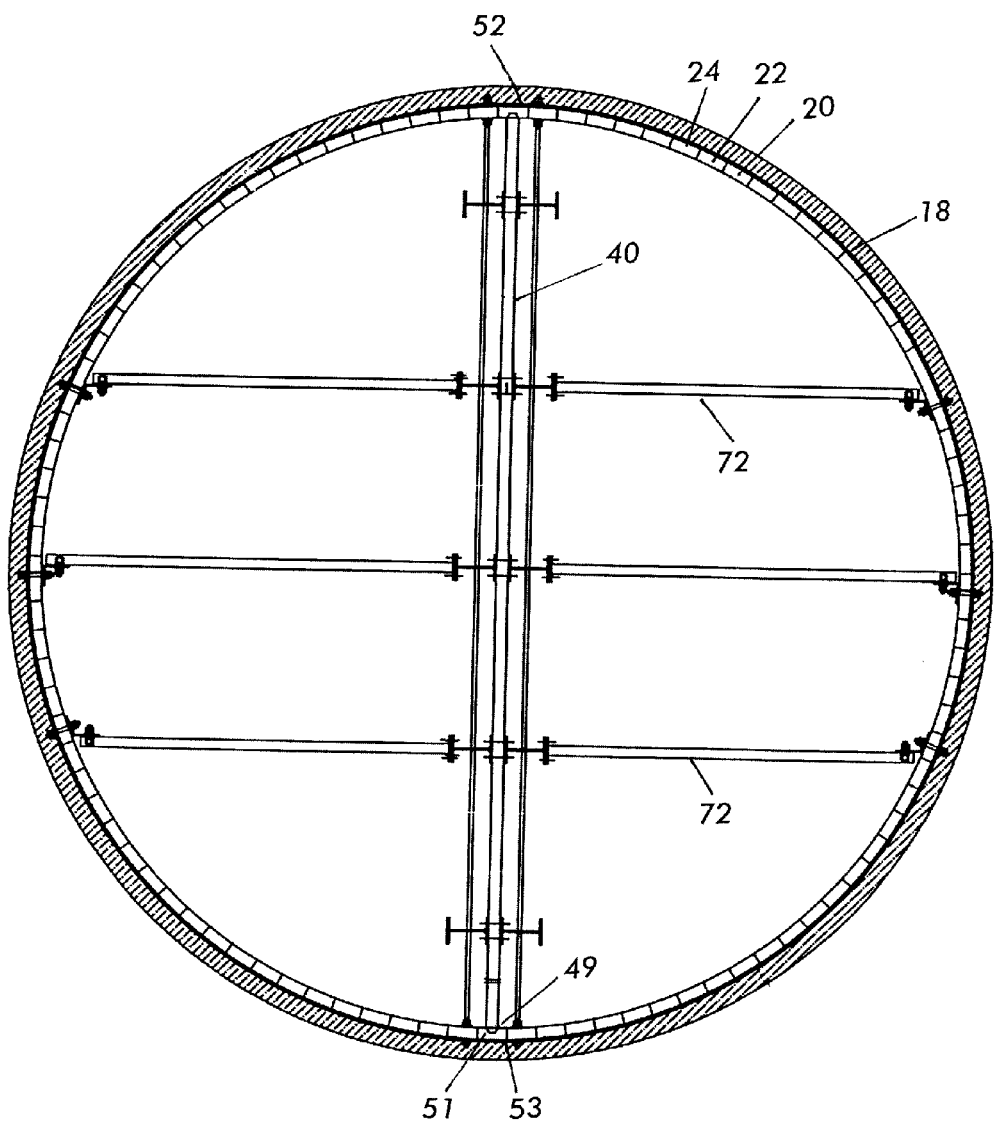
FIG. 7 is a view from above at a cross section at the bottom section of the tank in FIG. 1.

In FIGS. 4 and 5, there is a fixture 60 and 62 at each side of the dividing wall 40 just below the height of a respective first truss rod 54 or 56. The fixtures 60, 62 are at approximately the radial center of the dividing wall along the diameter of the tank wall 11.

At each of the fixture 60, 62, there is a respective plurality of second, radial truss rods 64 at one fixture 60 and 66 at the other fixture 62. Because the fixtures 60, 62 are outward of the dividing wall, the second truss rods 64, 66 are not precisely radial and the second truss rods 64 at one side of the dividing wall 40 are not aligned with the second truss rods 66 at the other side of the dividing wall 40. Each of the plurality of radial truss rods at each height level of the hoop segments 21 is fixed at the respective fixture 60, 62 and extends through a stave in the wall 14 of the tank to be secured there by a fastener located at the L cross-section hoop segment 21 where the second truss rods are tightened. Tightening of the second truss rod 64, 66 draws the hoop segments 21 inward against the tank staves on which the hoop fragments rest and pulls the hoop segments radially inward, so that the hoops 18 at the top and bottom and the hoop segments 19, 21 bias the staves of the tank wall inward.

Figure 2:
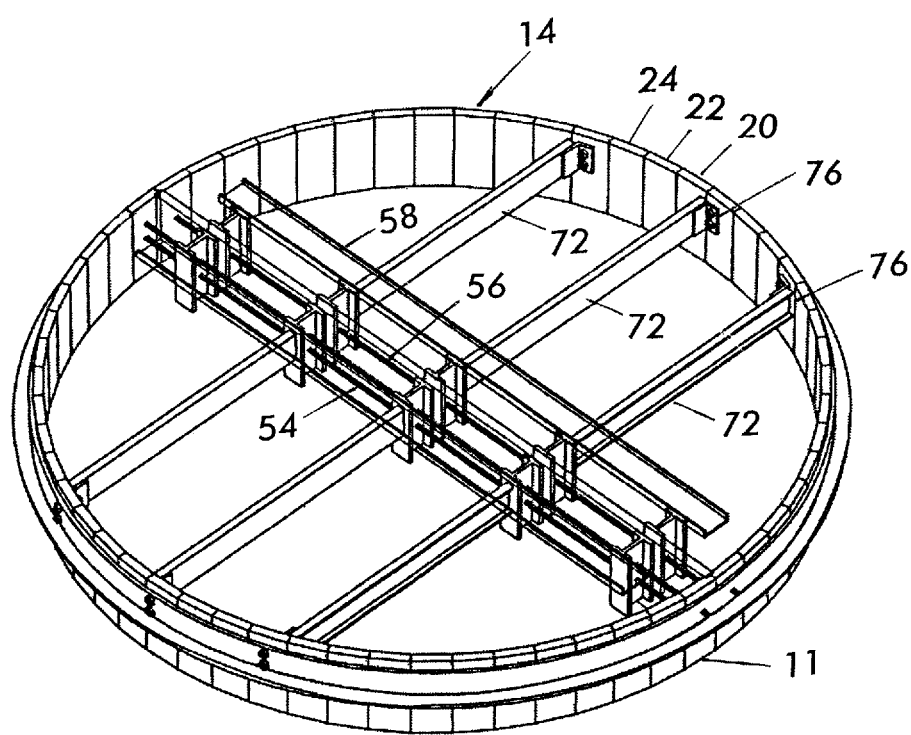
FIG. 2 is a perspective view of a top section of the tank in FIG. 1.
Figure 3:
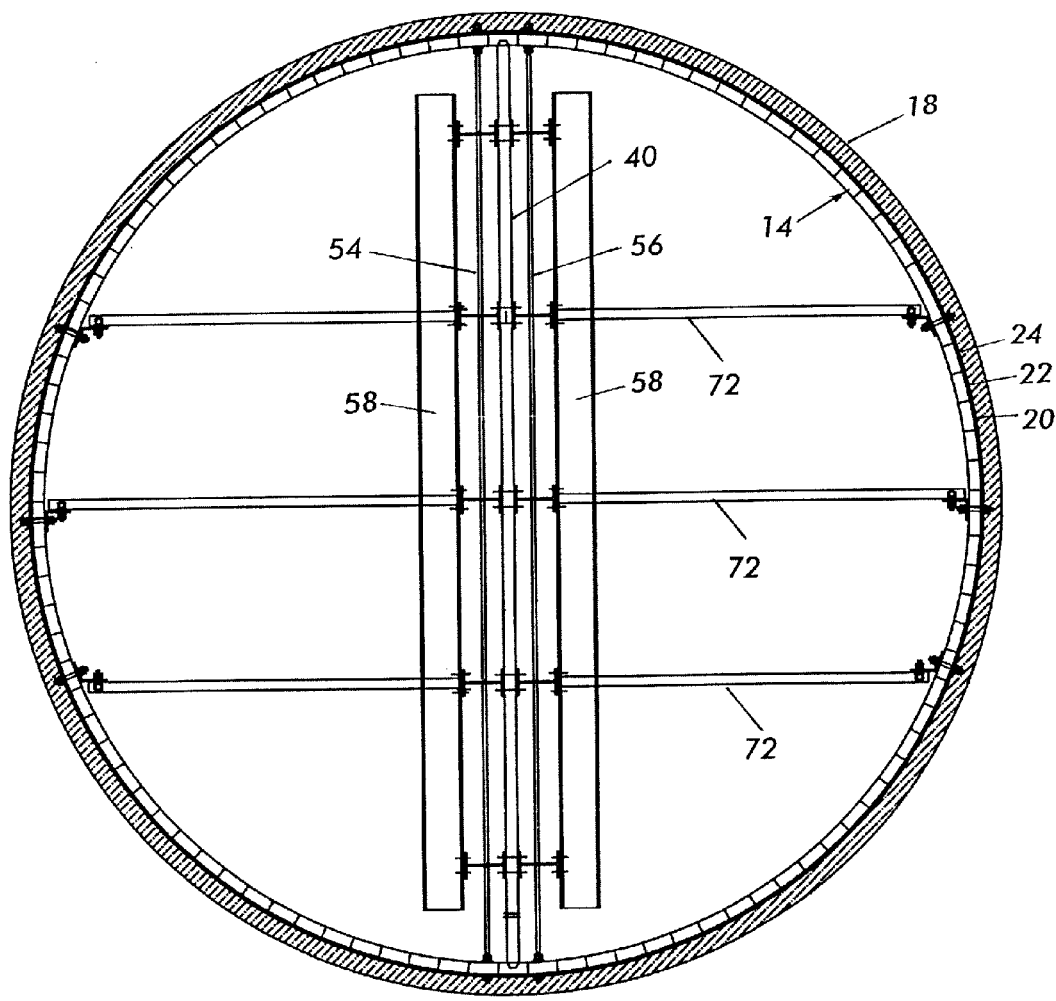
FIG. 3 is a view from above into the top section of the tank in FIG. 2.

To further secure the staves of the tank wall, at height intervals along the height of the tank wall 14 below the first truss rods, there are a plurality, with three being illustrated, horizontal channels 72 at the diameter and channels 74 at chords across the tank. The horizontal channels are attached at fastenings 76 located at the opposite ends of the horizontal channels to respective staves at the side wall 14 of the tank. As seen in FIG. 2, each horizontal channel 72, 74 either passes through or at least is connected to the vertical I-beams 48, 50. The horizontal channels further support the staves of the tank wall 14.

While the tank 11, 12, 14 and the dividing wall 40 are made of wood, the internal first and second truss rods 54, 56, 64, 66 which extend across and through the tank are preferably of stainless steel, so that they will not corrode in the presence of water. The internal channels and beams, which are also exposed to water, are preferably of a coated steel also to prevent corrosion of those steel elements. The external hoops and compression rings 18 and 19 are preferably of galvanized steel. Although they are not exposed to the water, nonetheless their corrosion is undesirable as it could weaken the important tightening for clamping parts.

In this embodiment, there is secure mounting of the wooden dividing wall inside the wooden tank with both the tank wall and the dividing wall being comprised of staves or narrow elongate boards.

The respective dimensions of the boards or staves is a matter of choice for the particular size, shape and wooden material of the tank. The choice of wood for the tank is also a matter of choice so long as it has the required strength and stiffness, imperviousness to water, reduced warping, long life, and other characteristics one would want from a wood structure continuously subjected to water.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An apparatus for securing together elements which define a tank for holding liquid and for preventing escape of liquid from the tank, wherein the tank that is defined comprises a plurality of elements arranged for defining a periphery of the tank, including adjacent elements which contact each other and are positioned to define the periphery, and the adjacent elements are urged together for preventing leakage from the tank between the adjacent elements;

the apparatus comprising:

at least three hoops around the periphery of the tank and at an outside of the tank elements, one hoop is toward a top of the tank periphery, one hoop is toward a bottom of the tank periphery and one is between the top and bottom location hoops;

the hoops being of respective circumferential lengths for being tightened around the outside of the tank elements and for squeezing adjacent tank elements together for preventing leakage between the adjacent elements;

a plurality of truss rods connected at at least one of the hoops at various locations around the hoop, a support in the tank for each of the truss rods wherein the truss rods are connected between the at least one hoop at the periphery of the tank and the support for the truss rod inside the tank; and a device for tightening each of the truss rods between the at least one hoop and the support in the tank for pulling the at least one hoop inward against the periphery of the tank elements and toward the truss rod support in the tank for thereby also squeezing the adjacent tank elements together to cause the tank wall to prevent leakage between the adjacent tank elements.

2. The securing apparatus of claim 1, wherein the at least one hoop is divided into a plurality of separate partially circumferential hoop segments which are positioned and shaped to together define the at least one hoop; and at least one of the truss rods being connected with each of the plurality of the hoop segments and the truss rods being tightened by the device for tightening each of the truss rods to urge each of the hoop segments of the at least one hoop inward toward the supports to squeeze the adjacent elements of the tank together.

3. The apparatus of claim 2, wherein the hoop segments of the at least one hoop are circumferentially spaced apart around the at least one hoop.

4. The apparatus of claim 2, further comprising:
a divider extending across the tank and having opposite ends engaging respective divider engaging hoop segments at the tank periphery;
second truss rods extending across the tank and having respective second opposite ends that engage the respective divider engaging hoop segments at each end of the second truss rods; and
the second truss rods being tightened for pulling the divider engaging hoop segments against the divider and sealing the divider engaging hoop segments to the divider to prevent leakage past the divider.

5. The apparatus of claim 4, further comprising a bottom of the tank secured to the tank elements in a manner to prevent leakage between the tank elements and the bottom of the tank.

6. The apparatus of claim 5, further comprising the supports for the end of each truss rod are attached at respective locations in the tank along the length of the divider across the tank.

7. The apparatus of claim 3, wherein the tank elements comprise vertically extending staves arranged in an array defining adjacent staves around and defining the periphery of the tank and extending the height of the periphery of the tank between the one hoop toward the bottom of the tank periphery and the one hoop toward the top of the tank periphery;
the hoops engaging outsides of the staves, and the hoops and the array of staves are respectively sized and the hoops are of such circumference that the hoops are tightened by tightening of the truss rods against the hoops to which the truss rods are attached for applying inwardly directed force on the staves for squeezing the staves together.

8. The apparatus of claim 7, wherein the divider comprises:
a vertical array of divider staves arranged one above the other, each divider stave extending across the tank to the vertically extending staves at the periphery of the tank;
at least one beam extending vertically along the divider and pressing against the divider to hold adjacent divider staves together in a sealing manner to prevent leakage between adjacent divider staves.

9. The apparatus of claim 8, further comprising a respective one of the vertically extending beams at each opposite side of the divider and the beams are placed to cooperate to hold adjacent divider staves of the divider in a leakage preventing manner.

10. The apparatus of claim 2, wherein fewer than all of the hoops comprise the array of hoop segments, and there are respective ones of the truss rods for each of the hoops comprised of hoop segments.

11. The apparatus of claim 10, wherein the hoop toward the top of the tank periphery and the hoop toward the bottom of the tank periphery are continuous in circumference and not defined by separate hoop segments.

12. The apparatus of claim 4, further comprising third truss rods at about the heights of some of the hoops and extending across the tank along chords of the tank shape and extending across the directions of the truss rods, the third truss rods having ends that are secured to the elements of the tank at the periphery of the tank.

13. The apparatus of claim 12, wherein the third truss rods extend across the divider.

* * * * *